US011405195B2

(12) United States Patent
Graham

(10) Patent No.: US 11,405,195 B2
(45) Date of Patent: Aug. 2, 2022

(54) DEVICE AUTHENTICATION

(71) Applicant: Hewlett-Packard Development Company, L.P., Spring, TX (US)

(72) Inventor: Christoph J. Graham, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 217 days.

(21) Appl. No.: 16/646,204

(22) PCT Filed: Oct. 2, 2017

(86) PCT No.: PCT/US2017/054711
§ 371 (c)(1),
(2) Date: Mar. 11, 2020

(87) PCT Pub. No.: WO2019/070227
PCT Pub. Date: Apr. 11, 2019

(65) Prior Publication Data
US 2020/0274706 A1    Aug. 27, 2020

(51) Int. Cl.
*H04L 9/08*      (2006.01)
*G06F 16/22*     (2019.01)
*H04L 9/06*      (2006.01)
*H04L 9/32*      (2006.01)
*H04L 9/40*      (2022.01)

(52) U.S. Cl.
CPC ........ *H04L 9/0866* (2013.01); *G06F 16/2246* (2019.01); *G06F 16/2255* (2019.01); *H04L 9/0643* (2013.01); *H04L 9/3226* (2013.01); *H04L 9/3236* (2013.01); *H04L 63/0876* (2013.01)

(58) Field of Classification Search
CPC ... H04L 9/0866; H04L 9/0643; H04L 9/3226; H04L 9/3236; H04L 63/0876; G06F 16/2246; G06F 16/2255; G06F 21/46; G06F 21/44
See application file for complete search history.

(56) References Cited

U.S. PATENT DOCUMENTS 7,302,377 B1 * 11/2007 Deepak ................. G06F 30/33
                                                          703/14
9,571,287 B2    2/2017 Narayanamurthy
(Continued)

FOREIGN PATENT DOCUMENTS

EP          2959631 A1    12/2015
KR       20120071193 A     7/2012
WO    WO-2001043344 A1     6/2001

OTHER PUBLICATIONS

Bauer, D. et al., "Minimum Information Disclosure with Efficiently Verifiable Credentials", 2007.

*Primary Examiner* — J. Brant Murphy
(74) *Attorney, Agent, or Firm* — Brooks Cameron & Huebsch PLLC

(57) ABSTRACT

A method related to authenticating a device may include accessing a plurality of hash values, wherein the plurality of hash values corresponds to a plurality of passwords of a plurality of devices. The method may also include generating a hash value corresponding to the device and authenticating the device by providing the plurality of hash values and the hash value to an authentication system.

14 Claims, 5 Drawing Sheets

(56) References Cited

U.S. PATENT DOCUMENTS

| | | | |
|---|---|---|---|
| 9,614,682 B2 | 4/2017 | Buldas et al. | |
| 10,848,319 B2* | 11/2020 | Uhr | G06F 21/33 |
| 2006/0117175 A1* | 6/2006 | Miura | G06F 21/445 |
| | | | 713/155 |
| 2008/0091945 A1* | 4/2008 | Princen | H04L 9/3236 |
| | | | 713/170 |
| 2011/0314153 A1* | 12/2011 | Bathiche | H04L 67/16 |
| | | | 709/225 |
| 2013/0083926 A1* | 4/2013 | Hughes | H04L 9/08 |
| | | | 380/278 |
| 2015/0033305 A1* | 1/2015 | Shear | G06F 21/6218 |
| | | | 726/6 |
| 2015/0222619 A1* | 8/2015 | Hughes | H04L 9/0852 |
| | | | 713/168 |
| 2015/0295720 A1* | 10/2015 | Buldas | H04L 9/3263 |
| | | | 713/176 |
| 2016/0077977 A1* | 3/2016 | Narayanamurthy | H04L 9/3239 |
| | | | 713/193 |
| 2017/0230182 A1* | 8/2017 | Misoczki | H04L 9/3247 |
| 2019/0182042 A1* | 6/2019 | Ebrahimi | H04L 63/083 |

\* cited by examiner

DEVICE AUTHENTICATION

BACKGROUND

Device authentication can include a security mechanism designed to allow authorized devices to connect to a network, site, and/or service. Device authentication can include password management. A password manager can assist in generating and retrieving passwords and/or can store the passwords or calculate the passwords on demand.

DETAILED DESCRIPTION

Figure 1:
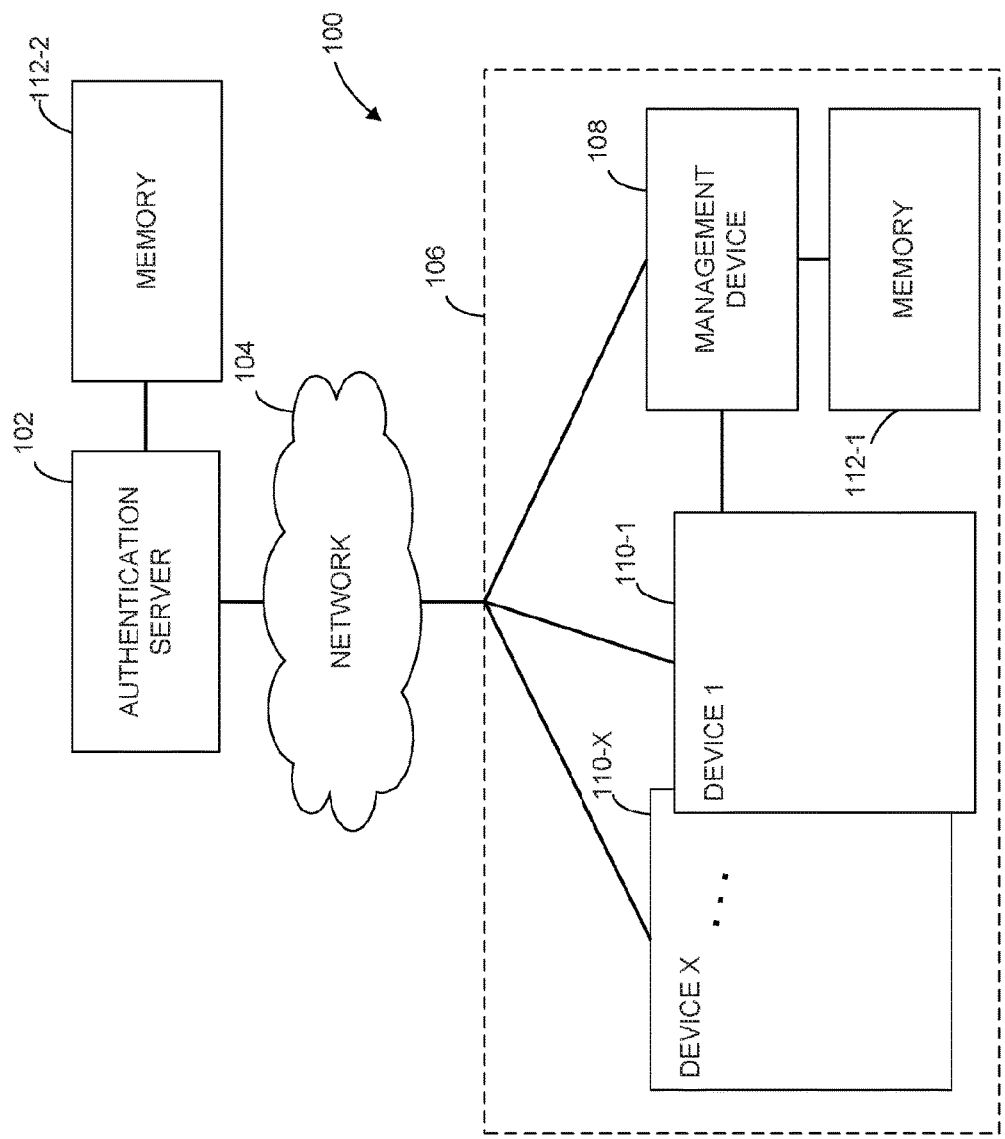
FIG. 1 illustrates an example of a system for device authentication consistent with the disclosure.

Security is a concern for many customers. A tool for managing device security is the password. Passwords are a form of key security defense. Key security defenses may be compromised easily. For example, passwords may be compromised due to human error. A customer may choose not to deal with the complexities of a strong password scheme and instead opt to select a password that is easy to remember or recreate. Consequentially, it may also be human nature to use the same password for multiple security targets. In some approaches, a same password may be applied to an entire class of resources such as computer systems and/or computer devices.

For example, a common password scheme can include C(n)=P, where C(n) represents a class object being protected and P represents a password. In some instances, a password management system can be utilized to aggregate passwords for a class of products such that C(n)=P(n), where C(n) represents a class object being protected and P(n) represents the password corresponding to the class object. A third-party service may also be utilized to validate passwords such that C(n):=Service(P). However, this may utilize implied trust and/or a communication pathway between C(n) and Service which may be limiting. In yet other instances, a security proof using public and private keys such as C(n):=PK(U) may be utilized, where PK(U) represents a public key belonging to a user and C(n) knows the corresponding private key. This may utilize storage and knowledge of private key material between both parties and may also require access to a third-party authority (e.g., a certificate authority) to provide proof. The above implementations of device authentication may be limiting on security and/or physical resources.

In some examples of the present disclosure, a reliance on weak password schemes and password deployments through a system can be reduced. For instance, the reliance, in some examples, can be eliminated. Some examples can reduce and/or eliminate password deployments through a system in a way that may not create undue burden in managing unique and strong passwords across a class of systems.

For example, a hash tree can be created from a number of passwords corresponding to a number of devices. The number of devices can be authenticated utilizing a node of the hash tree or a plurality of nodes of the hash tree. In some examples, a plurality of nodes of the hash tree can be used. For example, a first device from the number of devices can be authenticated utilizing a leaf node and/or an internal node instead of a password used to create a leaf node of the hash tree.

The examples described herein can improve over string password schemes, can support randomness of passwords across a large class of systems, and can provide a simple and resource inexpensive model for systems to compute proof anonymously. The examples can reduce and/or eliminate a reliance on easy-to-remember password schemes and encourage the use of random and cryptographically-strong passwords across large classes of resources. The examples can also create a layer of trust (e.g., proof) that a party and/or device is ire the participating class of secured users and/or devices. The examples, further, may not impose penalties to password recoverability, can be maintained anonymously, and can reduce and/or eliminate having to recover a password via hardware (e.g., reset jumper).

The figures herein follow a numbering convention in which the first digit corresponds to the drawing figure number and the remaining digits identify an element or component in the drawing. For example, reference numeral 104 may refer to element "04" in FIG. 1 and an analogous element may be identified by reference numeral 204 in FIG. 2. Elements shown in the various figures herein can be added, exchanged, and/or eliminated to provide a number of additional examples of the disclosure. In addition, the proportion and the relative scale of the elements provided in the figures are intended to illustrate the examples of the disclosure, and should not be taken in a limiting sense.

FIG. 1 illustrates an example of a system 100 for device authentication consistent with the disclosure. The system 100 includes an enterprise 106. The system 100 can also include a network 104 and/or an authentication server 102.

The enterprise 106 can include devices 110-1 to 110-X and a management device 108. As used, herein the devices 110-1 to 100-X are referred to as devices 110. The enterprise 106 can include an organization and/or an entity under which the devices 110 are managed, owned, and/or utilized. For example, the enterprise 106 can be a company and/or a data center. The enterprise 106 may also be a deployment of devices and/or a grouping of devices that can be reconfigured and/or provisioned after a purchase.

The devices 110 can include a plurality of devices which may be grouped. The devices 110 may include newly purchased, deployed, and/or reconfigured devices. For example, the device 110-1 may be a newly purchased, deployed, and/or reconfigured device and devices 110-2 to 110-X may be previously purchased, deployed, and/or reconfigured devices. In other examples, the devices 110-1 to 110-R (not shown) are newly purchased, deployed, and/or reconfigured devices and the devices 110-R to 110-X are previously purchased, deployed, and/or reconfigured devices. In other examples, the devices 110-1 to 110-X are newly purchased, deployed, and/or reconfigured devices.

Some examples provide a mechanism by which an interested party (e.g., user) can prove ownership or authority to access a secured device using a hash tree. In some examples, the authentication server 102 and/or the management server 108 can generate a hash tree. References to the authentication server 102 can include references to a device to generate the hash tree and/or a device that authenticates a device 110-1 and/or a portion of the devices 110, and/or the devices 110 based a node or nodes of the hash tree.

Figure 2:
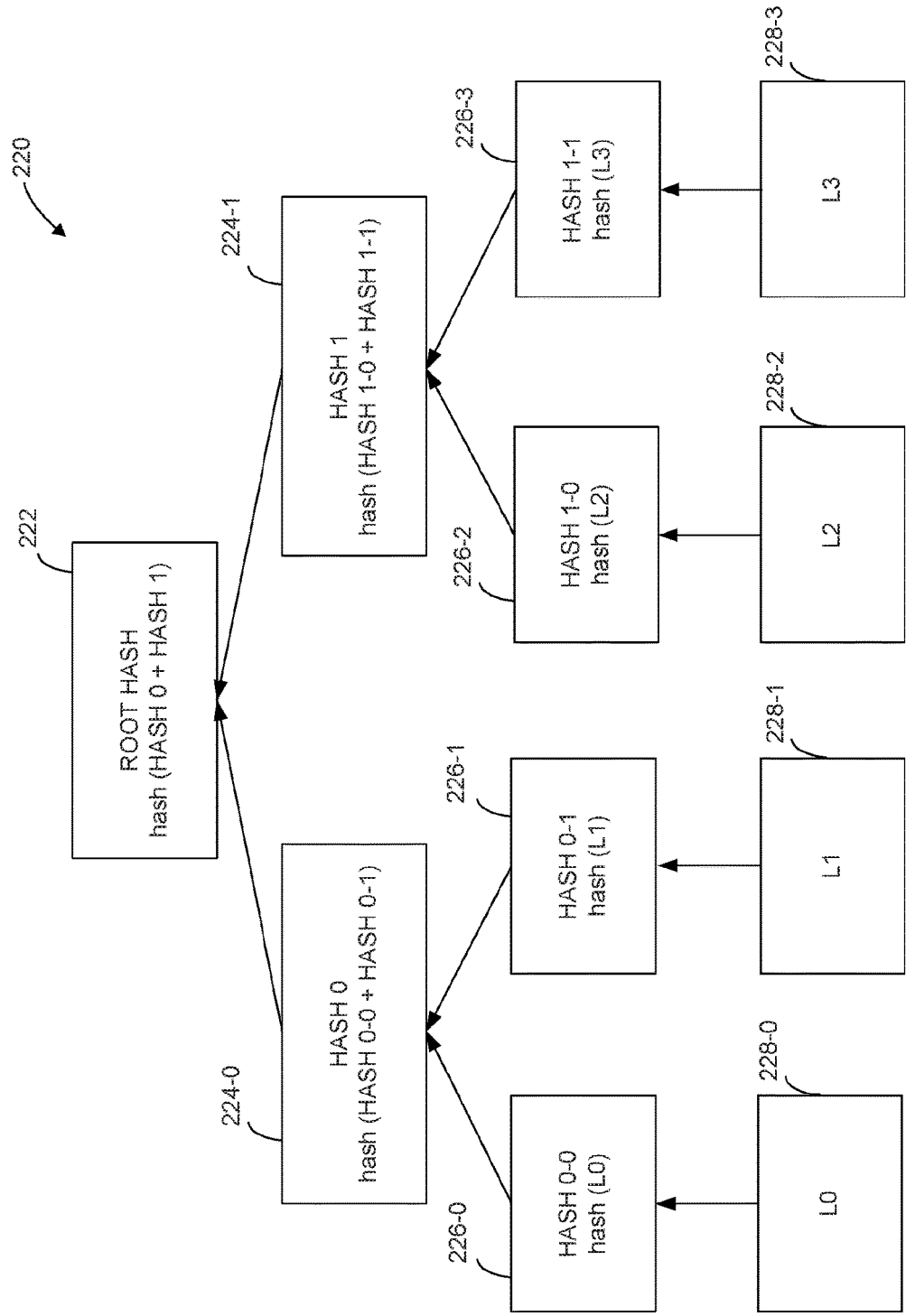
FIG. 2 illustrates an example of a hash tree consistent with the disclosure.

A hash tree or Merkle tree can be a tree in which each non-leaf node is labeled with the hash of the labels or values (e.g., in case of leaves) of its child nodes, Hash trees can allow efficient and secure verification of the contents of large data structures. Hash trees are a generalization of hash lists and hash chains. As such, the examples described herein can also be applied to hash lists and/or hash chains. FIG. 2 provides an example of a hash tree.

A hash tree can be constructed as follows. For each of the devices 110 in class C (e.g., class of devices), a unique password P can be constructed. The devices 110 (e.g., C(n)) can be locked utilizing the corresponding unique passwords P(n). Locking the devices 110 can create secured devices 110 (e.g., C(n)) in the class C. For example, the device 110-1 can be locked with H(P). H(P) can be stored in flash memory on the device 110-1. When a user authenticates, the user can provide P and H(P) can be computed to match the stored value. As such, P may not be directly provided by inspecting the memory of the device 110-1.

For every password (e.g., P(n)) constructed, a two-stage hash operation, given as H(H(P)), can be used to create a hash value, where H represents a one-way hash operation of significant cryptographic strength and P represents a unique password. The hash tree can be constructed using the hash values generated from the two-stage hash operations.

Each of the hash values generated from the passwords can be used to generate a leaf node of the hash tree. The leaf node is a node in the hash tree that does not link a child node. For example, a plurality of leaf nodes can be generated from the hash values generated from the passwords corresponding to the devices 110. There can be X leaf nodes in the example provided in FIG. 1. Each of the leaf nodes in the hash tree can store a value equal to the hash value generated from the two-stage hash operations.

From the leaf nodes of the hash tree, internal nodes and a root node can be generated. The internal nodes can include non-leaf nodes of the hash tree. Each of the non-leaf nodes can store a hash value generated by performing a hash operation on the hash values of one or more leaf nodes and/or one or more hash values of internal nodes.

A root node can store a hash value. The hash value can be generated from a hash operation. The hash operation can be implemented using a hash value of internal nodes and/or leaf nodes.

In some examples, the passwords used to secure the devices 110 can be removed from the authentication server 102. That is, the authentication server can delete the passwords and retain hash values generated from the passwords. In some examples, the passwords can be deleted after a one-stage hash operation is performed and a corresponding hash value is stored and/or a two-stage hash operation is performed and the corresponding hash value is stored. As used herein, a one-stage hash operation can be represented by H(P), where H represents a one-way hash operation of significant cryptographic strength and P represents a unique password.

The hash values (e.g., H(H(P))) corresponding to each of the devices 110 can be generated concurrently (e.g., at a same time) and/or within an iteration of a hash tree. In some examples, the hash values (e.g., H(H(P))) can be generated at different times.

For example, a first number of the hash values corresponding to a first number of the devices 110-1 can be generated at a different time than the generation of the second number of hash values corresponding to a second number of devices 110-2 to 110-X. A first hash tree can be generated based on the hash values corresponding to the devices 110-2 to 110-X. A second hash tree can be generated based on the hash values corresponding to the device 110-1 and the devices 110-2 to 110-X. The first hash tree can be used to authenticate the second number of devices 110-2 to 110-X. Upon the addition of the device 110-1 to the devices 110-2 to 110-X, the second hash tree can be used to authenticate the devices 110.

The authentication server 102, the management device 108, and/or another device charged with deploying, reconfiguring, and/or otherwise modifying the device 110 can share the root node and/or the root hash value corresponding to the root node with the devices 110. The authentication server 102, the management device 108, and/or another device charged with deploying, reconfiguring, and/or otherwise modifying the device 110 can also share a hash value of the corresponding device. That is, each of the device 110 can store a root hash value, root node, one or more hash values (e.g., H(P) and/or H(H(P))), and/or one or more leaf node.

The enterprise 106 can receive the locked devices 110 having stored therein at least the root hash value and the hash value generated from the passwords of a corresponding locked device. A plurality of nodes and/or hash values of the hash tree can be shared with the enterprise 106, the management device 108, and/or a user of the management device 108 and/or one or more systems of the enterprise 106, The plurality of nodes of the hash tree can include, for example, leaf nodes, internal nodes, and/or root nodes. In some examples, the management device 108 can receive a portion of the internal nodes of the hash tree. The management device 108 can also receive a portion of the leaf nodes of the hash tree. In yet other examples, the plurality of nodes of the hash tree can include a portion of the leaf nodes and a portion of the internal nodes.

The plurality of nodes that the management device 108 receives can include sufficient nodes to generate a root node of the hash tree. For example, each of the leaf nodes can be sufficient nodes to recreate the root node of the hash tree. In some examples; a combination of the internal nodes and the leaf nodes can be sufficient nodes to generate the root node of the hash tree.

The management device 108 can also receive hash values sufficient to recreate a root hash value corresponding to a root node of the hash tree. For example; the management device 108 can receive hash values instead of nodes of the hash tree. The management device 108 can also receive hash values in addition to receiving nodes of the hash tree.

In some examples, the management device 108 may not receive hash values, nodes, and/or hash trees from the authentication server 102. Instead, the management device 108 may gather hash values and/or nodes directly from the devices 110. For example, the management device 108, being coupled to each of the devices 100, can extract a hash value (e.g.; H(P) and/or H(H(P))) to obtain the hash values and/or nodes sufficient to generate the root node of the hash tree.

The management device 108 can perform a number of operations on the hash values extracted/received from the devices 110, For example, the management device 108 can extract a first hash value (e.g., H(P)) that is the result of a one-stage hash operation and convert the first hash value to a second hash value (e.g., H(H(P))) that is the result of a two-stage hash operation. The generated second hash value and a number of similarly created hash values corresponding to one or more of the devices 110 can be used to generate the root node and/or the root hash value of the hash tree.

The devices 110, the user, the management device 108, the devices 110, and/or the enterprise 106 can provide to the authentication server 102 hash values and/or nodes sufficient to reconstruct the root hash value and/or the root node to authenticate the user, the management device 108, the devices 110, and/or the enterprise 106 with the authentication server 102. In some examples, the management device 108 can gather the nodes and/or hash values used for authentication from the devices 110. For example, the management device 108 can query the devices 108 requesting the nodes and/or hash values. The query can be performed while the devices 110 are locked, unlocked, authenticated or unauthenticated.

In some examples, the management device 108 can store the nodes and/or hash values gathered from the devices 110 in a memory 112-1. As used herein the memory 112-1 and a memory 112-2 can be referred to as memory 112. The memory 112 can employ a database and/or a different storage scheme. The memory 112 can be any of the different memory types describe herein. Although the memory 112 is shown as being local to the management device 108 and/or the authentication server 102, the memory 112 can be external to the management device 109 and/or the authentication server 102 and can be accessed through a network such as the network 104.

In some examples, the memory 112-1 and/or memory 112-2 can be provided by a third-party service. That is, the management of the nodes and/or hash values available to the management device 108 can be a service provided by a third-party. In such examples, the management device 108 can be charged with gathering, organizing, and providing the nodes and/or the hash values to the third-party service. Storing the nodes and/or hash values in the third-party service may be done without exposing the devices 110 because no one node and/or hash value can be used to access a given one of the devices 110. Furthermore, the structure used to store the nodes and/or hash values in the memory may be a different structure than that used to provide the nodes and/or hash values to the authentication server 102 and/or a different structure than that in which the nodes and/or hash values were received. For example, the nodes and/or hash values can be received from the authentication server 102 as a hash tree and the nodes and/or hash values can be stored in the memory 112-1 using a list. As such, the identity of the leaf nodes, internal nodes, and/or root nodes and corresponding hash values may be indistinguishable from the nodes and/or hash values stored in the memory 112-1.

The management device 108 can also be charged with retrieving the nodes and/or hash values and providing the nodes and/or hash values to the authentication server 102 for authentication purpose. In examples where the authentication server 102 is implemented locally to the enterprise 106, the management device 108 and/or the enterprise 106 can authenticate one or more of the devices 110 based on the nodes and/or hash values retrieved from the memory 112-1.

Upon retrieving the hash values and/or the nodes requested by the authentication server 102, the management device 102 can provide the hash values and/or nodes to the authentication server 102 through the network 104. The authentication server 102 can receive the nodes and/or hash values and authenticate a number of the devices 110, the management device 108, the enterprise 106, and/or a user.

For example, the authentication server 102 can regenerate the hash tree from the received hash values and/or nodes. At the time of reception, the received hash values and/or nodes can be unknown to the authentications server 102 and as such may be referenced as unknown hash values and/or unknown nodes. That is, the source of the received hash values and/or nodes may be unauthenticated to the authentication server 102. The authentication server 102 may determine whether a hash tree (e.g., unknown hash tree) corresponding to the received hash values and/or nodes is a hash tree generated from the previously stored hash values and/or nodes of the provisioned devices 110 provided to the enterprise 108. As such, the hash tree corresponding to the received hash values may be referenced as an unknown hash tree.

The authentication server 102 can authenticate the one or more of the devices 110 by determining if the unknown hash tree (e.g., unauthenticated hash tree) is a same tree as the hash tree originally generated for the devices 110. The hash trees can be compared by comparing root nodes and/or root hash values. For example, an unknown root node and/or an unknown root hash value corresponding to the unknown hash tree can be compared to an original root node and/or the original hash value corresponding to the original hash tree generated for the devices 110. The comparison can determine if the unknown root hash value is equal to the original hash value and/or if the unknown root note is equal to the original root node.

The authentication server 102 can authenticate one or more of the devices 110, the management device 108, the enterprise 106, and/or the user if the original root hash value is equal to the unknown root hash value and/or the original node is equal to the unknown node. As used herein, the term equal can include approximately equal. "Approximately," as used herein, can include a value within a particular margin, range, and/or threshold. The authentication server 102 can refrain from authenticating one or more of the devices 110, the management device 108, the enterprise 106, and/or the user if the original root hash value is not equal to the unknown root hash value and/or the original node is not equal to the unknown node. Examples provided herein can allow for an ability to use a same authentication process to authenticate the devices 110, the management device 108, the enterprise 106, and/or a user. Similar, examples can allow for an ability to use a single authentication process to authenticate one or more of the devices 110. For instance, the hash values and/or nodes used to authenticate the device 110-1 can be used to authenticate any of the other devices 110-2 to 110-X.

Upon authentication, the management device 108 can perform an action or actions. For example, the management device 108 can unlock one or more of the devices 110. The management device 108 can also select a password used for authentication purposes with anyone of the devices 110. For example, the management device 108 can change a password used to log into (e.g., access) the device 110-1. Upon changing the password of the device 110-1, the authentication server 102 can reconstruct a hash tree corresponding to the devices 110. This can provide an added level of security given that each of the devices 110 are secured by the passwords corresponding to each of the other devices 110. Accordingly, the updating of the passwords of any of the devices 110 provides an updated security for each of the devices 110, Also, the use of weak passwords for any one of the devices 110 can be strengthened by the aggregation of multiple weak passwords given that each of the devices 110 can be secured by the passwords of the other devices 110.

In some examples, logging into each of the devices 110 can include authenticating with the corresponding device using the hash values, nodes, and/or the password associated with the corresponding device. The management device 108 can manage the form of login (e.g., local authentication vs. authentication with the authentication server 102) for each of the devices 110 upon authenticating any one of the devices 110 with the authentication server 102. If a local authentication for the device 110-1 employs a password, then the management device 108 may not provide the hash values and/or nodes to the authentication server 102. If the local authentication for the device 110-1 uses hash values and/or nodes, then the management device 108 may provide the hash values and/or nodes to the authentication server 102. If the local authentication for the device 110-1 uses hash values and/or nodes and a password, then the management device 108 may provide the hash values and/or nodes to the authentication server 102 while the device 110-1 authenticates the password. This form of authentication may be referred as a two stage/factor authentication with a first authentication occurring with the device 110 and a second authentication occurring with the authentication server 110.

The examples described herein can reduce the amount of data that a trusted authority maintains to prove the integrity of the data. Furthermore, the examples can reduce the network input/output (I/O) packet size to perform consistency and verification. Moreover, the memory 112 space used to store the nodes, hash values, and/or hash tree can be reduced over prior solutions. The proofs (e.g., comparisons) used in the examples described may be computationally less complex than alternative approaches. Further, the described authentication of the devices 110 can utilize a small and terse amount of information to be transmitted as compared to alternative forms of authentication across a network. The examples do not store private keys and do not utilize a security authority external to the authentication server 102 and/or the enterprise 106.

FIG. 2 illustrates an example of a hash tree 220 consistent with the disclosure. The hash tree 220 includes a root node 222, internal nodes, 224-0, 224-1, and leaf nodes 226-0, 226-1, 226-2, and 226-3. FIG. 2 also includes hash values 228-0, 228-1, 228-2, and 228-3.

The hash values 228-0, 228-1, 228-2, and 228-3 (e.g., L0, L1, L2, and L3) may be referred to as hash values 228. The hash values 228 can be the result of one-stage hash operations (e.g., H(P)) performed on passwords corresponding to different devices (e.g., devices 110 in FIG. 1). In some examples, the hash values 228 can be the result of two-stage hash operations (e.g., H(H(P))) performed on the passwords of different devices.

In an example where the hash values 228 are the result of one-stage hash operations (e.g., H(P)), the leaf nodes 226-0, 226-1, 226-2, and 226-3, referred to as leaf nodes 226, can be labeled HASH 0-0, HASH 0-1, HASH 1-0, and HASH 1-1, respectively. The leaf node 226-0 can store hash(L0) which can be a hash value resulting from a two-stage hash operation represented by hash(H(P)). The leaf node 226-1 can store hash(L1), the leaf node 226-2 can store hash(L2), and the leaf node 226-3 can store hash(L3).

The internal hash nodes 224-0 and 224-1 may be referred to as internal hash nodes 224. The internal hash node 224-0 is labeled HASH 0 while the internal hash node 224-1 is labeled HASH 1. The internal hash node 224-0 can store a hash value that is equal to the result of hash(HASH 0-0+ HASH 0-1). Hash(HASH 0-0+HASH 0-1) represents a hash operation performed on two hash inputs. For instance, hash(HASH 0-0+HASH 0-1) can receive two hash values (e.g., hash(L0) and hash(L1)). For example, hash(HASH 0-0+HASH 0-1) is performed on the hash value stored in the leaf node 226-0 (e.g., HASH 0-0) and the hash value stored in the leaf node 226-1 (e.g., HASH 0-1). The internal node 224-1 can store a hash value represented by the result of hash(HASH 1-0, HASH 1-1).

The hash operation represented by hash(HASH 0-0+ HASH 0-1) can indicate that the hash operation is performed on a result of an operation performed on a first hash value (e.g., hash(L1)) and a second hash value (e.g., hash (L2)). In FIG. 2, the operation performed on the first hash value and the second hash value is an addition operation. That is, the result of the summation of the first hash value and the second hash value can be used to perform the hash operation represented by hash(HASH 0-0+HASH 0-1). In other examples, the first hash value and the second hash value can be combined utilizing different operations such as a subtraction operation, a division operation, and/or a multiplication operation, among other operations. The root node 222 is labeled ROOT HASH and stores the result of the hash operation represented by hash(HASH 0+HASH 1).

While FIG. 2 shows each of the root nodes 222 and the internal nodes 224 as having two child nodes, in other examples each of the root node 222 and/or the internal nodes 224 can have one child node or a plurality of child nodes. For example, the root node 222 may have three child internal nodes and each of the child internal nodes may have four or five child leaf nodes and/or child internal nodes.

Providing the hash values sufficient to calculate the root hash value can include providing a leaf hash value, a plurality of leaf hash values, an internal hash value, and/or a plurality of internal hash values. The root hash value can be calculated from the hash values stored in the leaf nodes 226 and/or the internal nodes 224. For example, the root hash value stored in root node 222 can be calculated from the hash values stored in leaf nodes 226-0 and 226-1 and the hash value stored in the internal node 224-1. The root hash value can also be calculated from the hash values stored in leaf nodes 226-2 and 226-3 and the hash value stored in the internal node 224-0. In some examples, the root hash value can be calculated from the hash values stored in the leaf nodes 226 or the hash values stored in the internal nodes 224.

Figure 3:
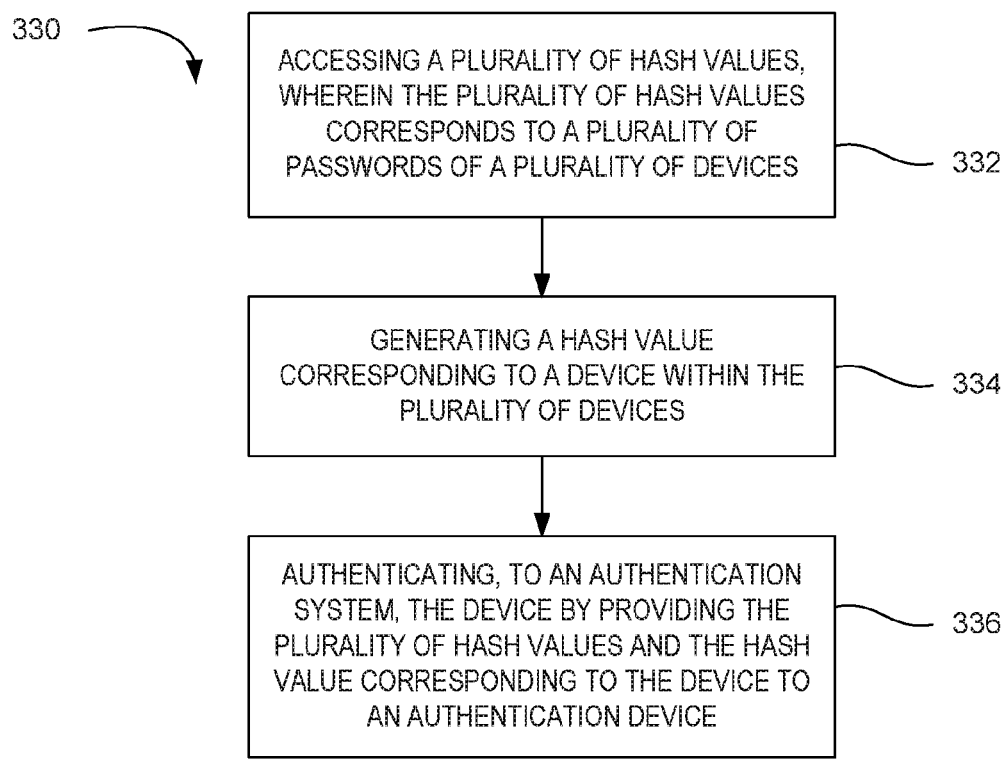
FIG. 3 illustrates an example flow diagram of a method consistent with the disclosure.

FIG. 3 illustrates an example flow diagram of a method 330 consistent with the disclosure. At 332, the method 330 can include accessing a plurality of hash values, wherein the plurality of hash values correspond to a plurality of passwords of a plurality of devices. At 334, the method 330 can include generating a hash value corresponding to a device within the plurality of devices. At 336, the method 330 can include authenticating, to an authentication system, the device by providing the plurality of hash values and the hash value corresponding to the device.

In some examples, the hash value corresponding to the device can be the result of a two-stage hash operation. Generating the hash value can further include performing a hash operation on a password, of the plurality of passwords, corresponding to the device before performing the two-stage hash operation. In some examples, the password of the plurality of passwords is disposed. Disposing of a plurality of passwords can include deleting the passwords and/or otherwise making the passwords unavailable. Disposing of the passwords can provide added security by limiting the availability of the passwords to third parties (e.g., malicious parties).

In some examples, accessing the plurality of hash values can further include accessing the plurality of hash values from a plurality of nodes of a hash tree. The method 330 further includes receiving the hash tree from an authentication system. At 332, the method 330 can include accessing the plurality of hash values can further include accessing the plurality of hash values from the plurality of devices.

Figure 4:
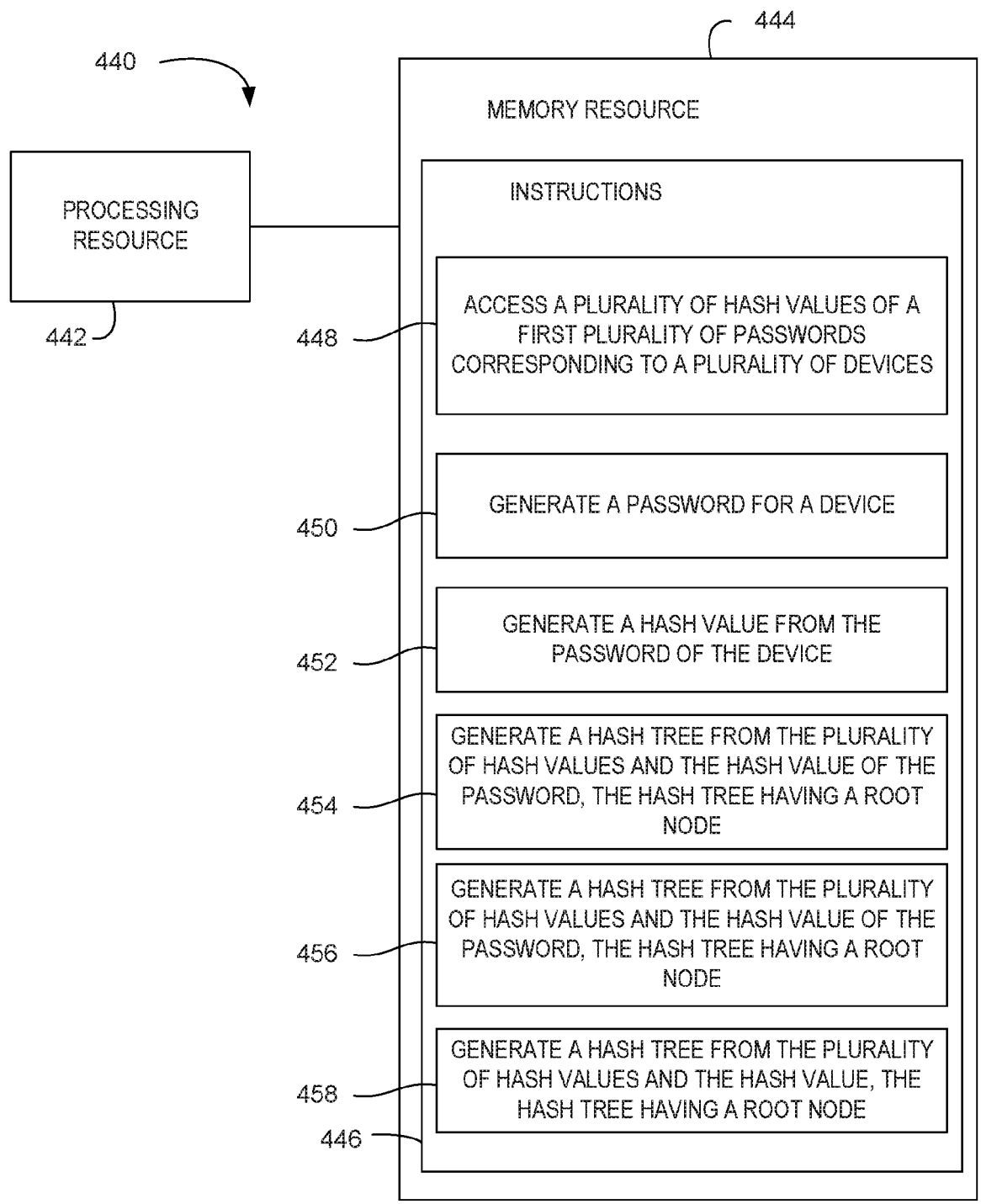
FIG. 4 illustrates an example of an apparatus consistent with the disclosure.

FIG. 4 illustrates an example of an apparatus 440 consistent with the disclosure. As shown in FIG. 4, the apparatus 440 includes a processing resource 442 and a memory resource 444. In some examples, the apparatus 440 may be a network controller, an AP, and/or a client. For example, the processing resource 442 and/or the memory resource 444 may include the network controller, or the processing resource 442 and the memory resource 444 may be part of the network controller.

The processing resource 442 may be a hardware processing unit such as a microprocessor, application specific instruction set processor, coprocessor, network processor, or similar hardware circuitry that can cause machine-readable instructions to be executed. The memory resource 444 may be any type of volatile or non-volatile memory or storage, such as random access memory (RAM), flash memory, read-only memory (ROM), storage volumes, a hard disk, or a combination thereof.

The memory resource 444 may store instructions 446 thereon. When executed by the processing resource 442, the instructions 446 may cause the apparatus 440 to perform specific tasks and/or functions. For example, at 448, the memory resource 444 may store instructions 446 which may be executed by the processing resource 442 to cause the apparatus 440 to access a plurality of hash values of a first plurality of passwords corresponding to a plurality of devices. For example, at 450, the memory resource 444 may store instructions 446 which may be executed by the processing resource 442 to cause the apparatus 440 to generate a password for a device. At 452, the memory resource 444 may store instructions 446 which may be executed by the processing resource 442 to cause the apparatus 440 to generate a hash value from the password of a device.

At 454, the memory resource 444 may store instructions 446 which may be executed by the processing resource 442 to cause the apparatus 440 to generate a hash tree from the plurality of hash values and the hash value of the password, the hash tree having a root node. At 456, the memory resource 444 may store instructions 446 which may be executed by the processing resource 442 to cause the apparatus 440 to receive a plurality of nodes of an unknown hash tree. Also, at 458, the memory resource 444 may store instructions 446 which may be executed by the processing resource 442 to cause the apparatus 440 to authenticate the device utilizing the plurality of nodes and the root node.

Apparatus 440 can include processing resource 442 to generate an unknown root node from the plurality of nodes corresponding to the unknown hash tree and/or to compare the unknown root node to the root node. In some examples, apparatus 440 can include the processing resource 442 to authenticate the device if the unknown root node is equal to the root node, wherein the unknown root node is equal to the root node if a first hash value stored in the unknown root node is equal to a second hash value stored in the root node. In some examples, authenticating the device can further include rejecting an authentication of the device if the unknown root node is not equal to the root node, wherein the unknown root node is not equal to the root node if a first hash value stored in the unknown root node is not equal to a second hash value stored in the root node.

Apparatus 440 can include processing resource 442 to receive each of the plurality of nodes of the unknown hash tree, and in some examples, receiving the plurality of nodes of the unknown hash tree can include receiving a plurality of internal nodes of the unknown hash tree. In some examples, apparatus 440 can include processing resource 442 to receive a plurality of leaf nodes of the unknown hash tree.

Figure 5:
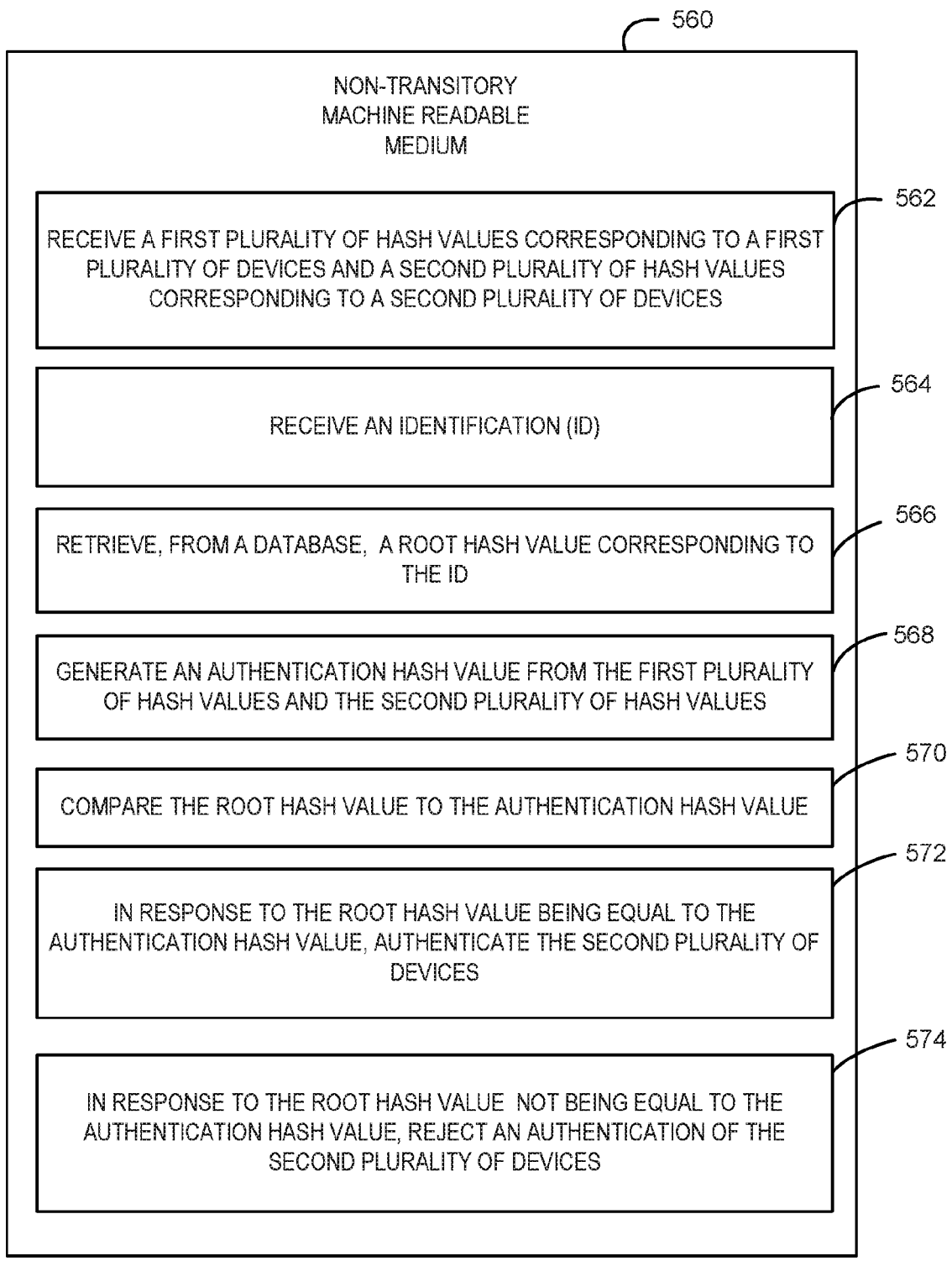
FIG. 5 illustrates an example non-transitory machine-readable medium consistent with the disclosure.

FIG. 5 illustrates an example non-transitory machine-readable medium 560 consistent with the disclosure. A processing resource may execute instructions stored on the non-transitory machine readable medium 560. The non-transitory machine readable medium 560 may be any type of volatile or non-volatile memory or storage, such as random access memory (RAM), flash memory, read-only memory (ROM), storage volumes, a hard disk, or a combination thereof.

The example medium 560 can store instructions 562 executable by a processing resource to receive a first plurality of hash values corresponding to a first plurality of devices and a second plurality of hash values corresponding to a second plurality of devices. The example medium 560 can store instructions 564 executable by a processing resource to receive an identification (ID) and instructions 566 executable by a processing resource to retrieve, from a database, a root hash value corresponding to the ID. In some instances, the example medium 560 can store instructions 568 executable by the processing resources to generate an authentication hash value from the first plurality of hash values and the second plurality of hash values and instructions 570 executable by the processing resource to compare the root hash value to the authentication hash value. The example medium 560 can store instructions 572 executable by the processing resource to authenticate the second plurality of devices in response to the root hash value being equal to the authentication hash value and/or instructions 574 executable by the processing resource to reject an authentication of the second plurality of devices, in response to the root hash value is not equal to the authentication hash value.

In some examples, the instructions 564 executable to receive the ID can be further executable by the processing resource to receive a client ID, wherein the root hash corresponds to a hash tree associated with the client ID. The instructions 564 executable to receive the ID can be further executable by the processing resource to receive a device group ID, wherein the root hash corresponds to a hash tree of a group of devices with a device group ID.

The instructions 564 executable to receive the ID can be further executable by the processing resource to receive an account ID, wherein the root hash corresponds to a hash tree associated with an account with the account ID. In some examples, the first plurality of devices can include authenticated devices and the second plurality of devices can include unauthenticated device.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. A method for authenticating a device, comprising:
accessing a plurality of hash values, wherein the plurality of hash values corresponds to a plurality of passwords of a plurality of devices;
generating a hash value corresponding to a password of a device of the plurality of devices;
generating a hash tree from the plurality of hash values and the hash value corresponding to the password, the hash tree having a root node; and
authenticating, to an authentication system, the device utilizing a plurality of nodes of an unknown hash tree and the root node of the generated hash tree.

2. The method of claim 1, wherein generating the hash value corresponding to the device further comprises performing a hash operation on the password, of the plurality of passwords, corresponding to the device before performing a two-stage hash operation.

3. The method of claim 2, wherein the password of the plurality of passwords is disposed.

4. The method of claim 1, where accessing the plurality of hash values further comprises accessing the plurality of hash values from the plurality of devices.

5. A network device comprising:
a memory; and
a processor executing instructions stored in the memory to:
access a plurality of hash values of a first plurality of passwords corresponding to a plurality of devices;
generate a password for a device;
generate a hash value from the password of the device;
generate a hash tree from the plurality of hash values and the hash value of the password, the hash tree having a root node;
receive a plurality of nodes of an unknown hash tree; and
authenticate the device utilizing the plurality of nodes and the root node.

6. The network device of claim 5, wherein the processor further to generate an unknown root node from the plurality of nodes corresponding to the unknown hash tree.

7. The network device of claim 6, wherein the processor to authenticate the device is further to compare the unknown root node to the root node.

8. The network device of claim 7, wherein the processor to authenticate the device is further to:
authenticate the device in response to the unknown root node being equal to the root node, wherein the unknown root node is equal to the root node if a first hash value stored in the unknown root node is equal to a second hash value stored in the root node.

9. The network device of claim 7, wherein the processor to authenticate the device is further to:
reject an authentication of the device in response to the unknown root node not being equal to the root node, wherein the unknown root node is not equal to the root node if a first hash value stored in the unknown root node is not equal to a second hash value stored in the root node.

10. The network device of claim 5, wherein the processor to receive the plurality of nodes of the unknown hash tree is further to receive each of the plurality of nodes of the unknown hash tree.

11. The network device of claim 5, wherein the processor to receive the plurality of nodes of the unknown hash tree is further to receive a plurality of internal nodes of the unknown hash tree.

12. The network device of claim 5, wherein the processor to receive the plurality of nodes of the unknown hash tree is further to receive a plurality of leaf nodes of the unknown hash tree.

13. A non-transitory machine-readable medium storing instructions executable by a processing resource to:
receive a first plurality of hash values corresponding to a first plurality of devices and a second plurality of hash values corresponding to a second plurality of devices;
receive an identification (ID);
retrieve, from a database, a root hash value corresponding to the ID;
generate an authentication hash value from the first plurality of hash values and the second plurality of hash values;
compare the root hash value to the authentication hash value;
in response to the root hash value being equal to the authentication hash value, authenticate the second plurality of devices; and
in response to the root hash value not being equal to the authentication hash value, reject an authentication of the second plurality of devices.

14. The non-transitory machine-readable medium of claim 13, wherein the first plurality of devices is a plurality of authenticated devices and the second plurality of devices is a plurality of unauthenticated device.

* * * * *